United States Patent
Pieronek et al.

(10) Patent No.: US 9,026,311 B1
(45) Date of Patent: May 5, 2015

(54) TRAILER SWAY DETECTION AND METHOD FOR REDUCING TRAILER SWAY UTILIZING TRAILER BRAKES

(71) Applicants: Donald Pieronek, Brookfield, WI (US); Alan Hoogenakker, Urbandale, IA (US)

(72) Inventors: Donald Pieronek, Brookfield, WI (US); Alan Hoogenakker, Urbandale, IA (US)

(73) Assignee: Tuson RV Brakes, LLC, Vernon Hills, IL (US)

( * ) Notice: Subject to any disclaimer, the term of this patent is extended or adjusted under 35 U.S.C. 154(b) by 56 days.

(21) Appl. No.: 13/800,885

(22) Filed: Mar. 13, 2013

(51) Int. Cl.
| B60T 7/20 | (2006.01) |
| B60W 10/18 | (2012.01) |
| B60W 10/22 | (2006.01) |
| B62D 47/00 | (2006.01) |

(52) U.S. Cl.
CPC ............... *B60W 10/18* (2013.01); *B60W 10/22* (2013.01)

(58) Field of Classification Search
CPC ...... B60T 7/20; B62D 47/00; B62D 53/0871; B60D 1/242; B60D 1/40; B60D 1/305
USPC ................. 701/48, 36, 41, 50, 70; 280/455.1, 280/124.106; 340/431; 303/7; 180/165
See application file for complete search history.

(56) References Cited

U.S. PATENT DOCUMENTS

| 3,972,543 | A | * | 8/1976 | Presley et al. ............... 280/455.1 |
| 5,033,798 | A | | 7/1991 | Breen |
| 5,579,228 | A | * | 11/1996 | Kimbrough et al. ............ 701/41 |
| 5,910,217 | A | | 6/1999 | Sargent |
| 6,042,196 | A | * | 3/2000 | Nakamura et al. ................. 303/7 |
| 6,446,998 | B1 | * | 9/2002 | Koenig et al. ................. 280/432 |
| 6,450,019 | B1 | | 9/2002 | Wetzel et al. |
| 6,668,225 | B2 | | 12/2003 | Oh et al. |
| 6,959,970 | B2 | | 11/2005 | Tseng |
| 7,114,787 | B2 | | 10/2006 | Mederer et al. |
| 7,272,481 | B2 | | 9/2007 | Einig et al. |
| 7,447,585 | B2 | | 11/2008 | Tandy, Jr. et al. |
| 7,512,472 | B2 | | 3/2009 | Tandy, Jr. et al. |
| 7,690,737 | B2 | | 4/2010 | Lu |
| 7,731,302 | B2 | | 6/2010 | Tandy, Jr. et al. |
| 7,734,405 | B2 | | 6/2010 | Tandy, Jr. et al. |
| 7,798,263 | B2 | | 9/2010 | Tandy, Jr. et al. |
| 7,826,953 | B2 | | 11/2010 | Traechtler |
| 7,917,274 | B2 | | 3/2011 | Hackney et al. |
| 7,950,751 | B2 | | 5/2011 | Offerle et al. |
| 8,326,504 | B2 | | 12/2012 | Wu et al. |
| 2008/0169144 | A1 | * | 7/2008 | DeGrave et al. ............... 180/165 |
| 2009/0045603 | A1 | * | 2/2009 | Huntimer .................... 280/455.1 |
| 2009/0105906 | A1 | * | 4/2009 | Hackney et al. ................ 701/38 |
| 2009/0198425 | A1 | * | 8/2009 | Englert ............................ 701/70 |
| 2010/0152920 | A1 | * | 6/2010 | McCann ........................... 701/2 |
| 2011/0022282 | A1 | * | 1/2011 | Wu et al. ......................... 701/70 |
| 2011/0257860 | A1 | * | 10/2011 | Getman et al. ................... 701/70 |
| 2012/0041659 | A1 | * | 2/2012 | Greene ............................ 701/70 |
| 2012/0109471 | A1 | * | 5/2012 | Wu ................................. 701/49 |
| 2013/0124059 | A1 | | 5/2013 | Funder et al. |

* cited by examiner

*Primary Examiner* — Tan Q Nguyen
(74) *Attorney, Agent, or Firm* — Boyle Fredrickson, S.C.

(57) ABSTRACT

When a trailer is pulled by a tow vehicle where the trailer begins to sway to the left and right of the tow vehicle a large sway can result in loss of control of the trailer and or tow vehicle. The field of the present invention is a system and method of controlling a trailer sway which comprises determining the sway of the trailer utilizing an electronic sensor and independently applying the left and or right trailer brakes at varying levels to reduce trailer sway the traditional single braking signal power from the tow vehicle is separated into two independent braking signals for each of the left and right brakes. All brakes are applied whenever the traditional braking signal goes active where trailer battery power is utilized to independently activate the left and or right brakes during trailer sway.

16 Claims, 7 Drawing Sheets

TRAILER SWAY DETECTION AND METHOD FOR REDUCING TRAILER SWAY UTILIZING TRAILER BRAKES

TECHNICAL FIELD

The field of the present invention is trailer sway control systems and more particularly the use of an electronic device to monitor trailer sway and then to utilize the application of trailer brakes to reduce the trailer sway.

BACKGROUND OF INVENTION

Trailer sway can create vehicle and trailer stability problems. Trailer sway occurs under specific conditions related to the location of the tow point of the trailer on the tow vehicle, the trailer weight applied at the trailer hitch and different loading of the trailer weight between the left and right trailer tires. Trailer sway is a condition in which the trailer swings in an oscillatory pattern side-to-side relative to the direction of the tow vehicle. The situation presents vehicle handling difficulties, where trailer sway can push the vehicle side-to-side, significantly increasing the risk of loss of control of the tow vehicle and or towed trailer.

Existing electronic anti sway systems focus on the tow vehicle, utilizing sensors and on board computers within the tow vehicle and then perform corrective actions within the tow vehicle to reduce the resulting sway of the tow vehicle. Relative to reducing sway at the trailer hitch various mechanical means exist which fall into two categories, weight distribution and anti sway hitches. These hitches use various mechanical means utilizing; torsion bars, rotating cams, actual movement of the hitch point and so forth to provide offsetting forces to reduce trailer sway. One electronic device exists which during a detected sway applies the trailer brakes, where testing reveals that applying all trailer brakes at the same time to reduce trailer sway is less effective than the individual control of left and right trailer brakes claimed in this invention.

When pulling a trailer where the trailer weight on the left tires and right tires are equal and where the weight on the trailer hitch is within a recommended range and where trailer tires are inflated properly and where the tow vehicle is also properly loaded then the trailer will follow directly behind the tow vehicle. When the weights within a trailer is not distributed evenly between the left tires and right tires or where lateral wind gusts occur due to the weather or large passing vehicles the trailer may begin to sway with increasing intensity to magnitudes which may eventually result in loss of control of the tow vehicle and or towed trailer.

Rather than offsetting the sway forces at the trailer hitch the only known electronic trailer sway device detects the trailer sway and then applies all the trailer brakes, where both left and right brakes are applied equally to dampen the sway where if the tow vehicle brakes are not applied, in theory the applied trailer brakes would attempt to pull the trailer, through braking friction, directly behind the tow vehicle. Although somewhat effective when tow vehicle brakes are not being applied, when the tow vehicle is also decelerating the equal braking on both left and right trailer brakes limits the ability to reduce trailer sway.

Although the various hitches are effective when these systems are installed and adjusted properly for a specific trailer and vehicle application, the purchase, installation and adjustment of anti sway hitches and other anti sway mechanisms results is relatively expensive system and thus these devices are in limited use.

RELATED U.S. PATENT DOCUMENTS:

| | | |
|---|---|---|
| 8,165,770 | Apr. 24, 2012 | Getman |
| 8,010,252 | Aug. 30, 2011 | Getman |
| 8,326,504 | Dec. 4, 2012 | Wu |
| 8,260,518 | Sep. 4, 2012 | Englert |
| 7,950,751 | May 31, 2011 | Offerle |
| 7,917,274 | Mar. 29, 2011 | Hackney |
| 7,826,953 | Nov. 2, 2010 | Traechtler |
| 7,798,263 | Sep. 21, 2010 | Tandy, Jr. |
| 7,734,405 | Jun. 8, 2010 | Tandy, Jr. |
| 7,731,302 | Jun. 8, 2010 | Tandy, Jr. |
| 7,690,737 | Apr. 6, 2010 | Lu |
| 7,512,472 | Mar. 31, 2009 | Tandy, Jr. |
| 7,447,585 | Nov. 4, 2008 | Tandy, Jr. |
| 7,272,481 | Sep. 18, 2007 | Einig |
| 7,114,787 | Oct. 3, 2006 | Mederer |
| 6,959,970 | Nov. 1, 2005 | Tseng |
| 6,668,225 | Dec. 23, 2003 | Oh |
| 6,450,019 | Sep. 17, 2002 | Wetzel |
| 5,910,217 | Jun. 8, 1999 | Sargent |
| 5,033,798 | Jul. 23, 1991 | Breen |
| 5,033,798 | Jul. 23, 1991 | Breen |

SUMMARY OF INVENTION

A system and method of controlling a trailer pulled by a vehicle which comprises determining the sway of the trailer and independently applying the left trailer brakes and or right trailer brakes to different magnitudes of braking force to reduce the trailer sway and thus resulting in the trailer following behind the tow vehicle. The invention utilizing existing trailer brakes where the invention separates the control of the left brakes from the right brakes to create individual left brake and right brake anti sway forces to reduce the trailer sway versus offsetting the impacts of trailer sway on the tow vehicle as is done with trailer hitch systems. By monitoring the trailer sway and determining the magnitude of braking forces applied if the invention determines when the trailer sway is not being reduced utilizing the current braking forces where the invention then increases the amount of braking applied either up to the maximum braking magnitudes possible or until the sway is reduced to desired levels. If the currently applied braking forces result in excessive trailer sway reduction rates the braking magnitude is then decreased until the desired level of sway control is achieved, thus dynamically adjusting for a range of changes in system behavior due to conditions beyond the control of the invention, such as brake wear, brake temperature, available battery voltage and so forth. The invention also performs various system diagnostics, including but not limited to monitoring for brake short circuits and disconnected brake wires and informing the vehicle operator of detected errors. Additionally the knowledge required to install and adjust the electronic sway control device is far simpler than existing solutions and thus makes sway control possible for a far greater number of trailer applications.

DETAILED DESCRIPTION

Figure 1:
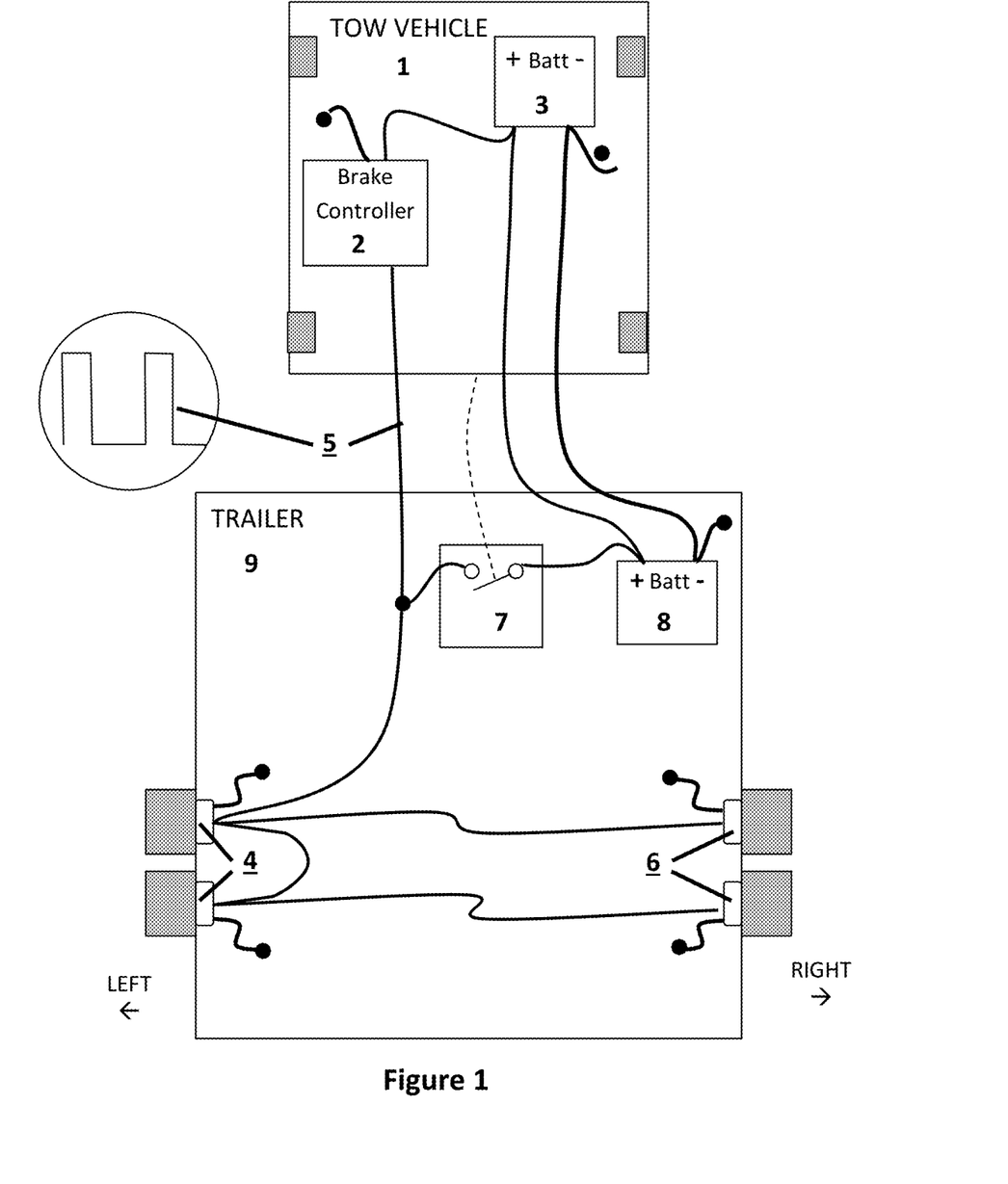
FIG. 1 is a traditional trailer braking system overview including the tow vehicle, tow vehicle brake controller, and trailer brake related wiring.

Although variations exist in the system configurations and the type of equipment used, FIG. 1 is a diagram of a typical existing tow vehicle and trailer brake system configuration that is common in the art. Relative to performing trailer braking the tow vehicle (1) contains an in vehicle brake controller (2) where the brake controller receives its power and ground from the vehicle battery (3). The available brake controllers (2) utilize a multitude of techniques to determine when the tow vehicle (1) is braking and then determining the magnitude of electrical power to be applied to all trailer brakes (4 and 5), including but not limited to monitoring the vehicle brake switch, electronic accelerometers, electrical potentiometers connected to brake pedals, pressure sensors installed in tow vehicle brake lines, monitoring data values from in vehicle controllers via in vehicle networks and so forth. Independent of the method used within the brake controller (1) to determine the desired magnitude of trailer braking to be applied, the resulting power is applied to the trailer brakes (4 and 5) via a single wire traditionally called the "blue wire" (5) where the term blue wire is used due to the color coding standard for brake wiring. In existing trailer braking systems utilizing electric brake actuators the left brakes (4) and right brakes (5) are both connected to the blue wire (5) originating from the in vehicle brake controller (2).

To vary the amount of power to both the left trailer brakes (4) and right trailer brakes (6), and thus vary the brake force, the common in the art method is to pulse width modulate the blue wire (5) where the power source for the blue wire signal is the vehicle battery voltage (3) which is then applied to the trailer brakes (4 and 5) at a frequency of around 300 Hertz. Pulse width modulation means to apply and remove a voltage as a specific frequency where the on time of the pulses vary from zero milliseconds to the full period of time allocated at the selected pulse width modulation frequency. Each brake pulse width for brake controllers (2) is typically 1/300 second or approximately 3.33 milliseconds in duration. The peak voltage, or high voltage, of the blue wire brake pulse is limited to the magnitude of the voltage available from the vehicle battery (3). Keeping the blue wire brake pulse high for one percent of the 3.33 milliseconds pulse period, or high for 0.0333 milliseconds is referred to as 1% duty cycle and keeping it high for 1.67 milliseconds of the pulse period is referred to as 50% duty cycle, and keeping it high for 3.33 milliseconds of the pulse period is referred to as 100% duty cycle. The longer the time interval of "high time" the greater will be the average current sent to the trailer brakes and thus the brake controller (2) is able to vary the brake pressure applied to the brake pads. The power applied to the trailer brakes (4 and 5) is defined as the average electrical current multiplied by the average electrical voltage for each "blue wire braking pulse". "Varying the magnitude of braking" means "varying the magnitude of electrical power" being applied to brakes where minimum power is provided at a 0% duty cycle blue wire braking pulse (no voltage applied) and maximum amount of power is applied at 100% duty cycle blue wire braking pulse (full battery voltage applied).

Per FIG. 1 government standards require that towed trailers (9) containing brakes also contain a break away switch (7) and a trailer battery (8) where the activation of the break away switch is physically connected to the tow vehicle (1) via a break away cable where while moving down the road should the trailer break loose from the tow vehicle that the break away cable shall pull a pin out of the break away switch where the break away switch contacts shall close and thus connect the trailer battery power to the electric brakes, thereby stopping the trailer. The trailer battery (8) is either directly or indirectly connected to the tow vehicle (1) battery (3) through a current limiting or battery charging device where tow vehicle battery (3) power is provided to the towed trailer (9) via a "black wire" and where tow vehicle (1) ground and towed trailer (9) grounds are interconnected via a "white wire".

This invention utilizes the existing electric brakes on towed trailers (9) to apply anti sway forces to counteract trailer sway where trailer sway is detected utilizing an electronic sensor connected to a microprocessor within the trailer sway controller where the microprocessor determines a change in "trailer sway angle" from which the trailer sway controller determines the orientation of the towed trailer (9) relative to the tow vehicle (1), the magnitude of trailer sway angle in the left and right directions. For example, when the trailer sway exceeds various thresholds and where the trailer sway controller determines the trailer movement from left to right is an actual trailer sway event versus turning a corner or changing lanes the trailer sway controller then applies left brakes (4) and or right brakes (6) at varying magnitudes while at various sway angles to reduce the trailer sway. The ability to counteract the trailer sway forces is dependent upon the weight of the trailer, the condition of the trailer electric brakes, the condition of the tires, the road surface conditions and so forth. Since variations in braking conditions can occur, minimally as the trailer brakes wear, as the temperature of the brakes change or the available braking voltages change, the trailer sway controller shall readjust its applied power to reduce the effect of these changes as is possible based upon measured values from the electronic sensor but more specifically from other internally derived information.

Since the trailer sway controller cannot compensate for various conditions outside its control, such as disconnected brake wires, shorted brakes, low supply voltage levels and so forth, the unit shall detect various types of fault conditions and take various actions and or inform the tow vehicle operator when detected faults exist. Many of the existing brake controllers (2) utilize various techniques to monitor the current flow going out the blue wire (5) to the trailer brakes (4 and 5), and if the current level drops below a preset level many brake controllers shall indicate "not connected" to the vehicle operator as a form of a continuity test. When current flow exceeds the not connected threshold these brake controllers indicate "connected". Other more advanced brake controllers change the blue wire variable pulse width blue wire (5) signal into a communications network and are thus capable of providing additional diagnostic information from various hydraulic brake controllers that support the blue wire network interface, but there are only one of these controllers on the market today and thus this network interface is not supported within the invention. Thus the trailer sway controller shall provide functionality where it intentionally disconnects the blue wire (5) signal from the trailer brakes (4 and 5) to indicate "not connected" as the only method of informing the tow vehicle (1) operator that a critical fault has been detected, similar to a "check engine light" within the tow vehicle.

Figure 2:
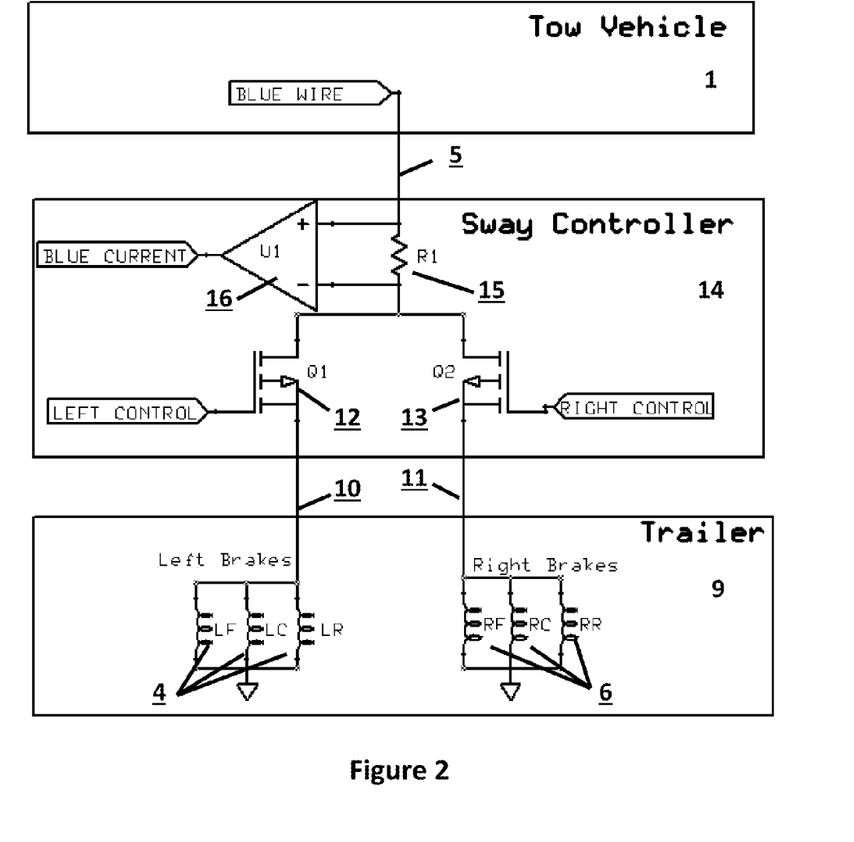
FIG. 2 is an electrical schematic of the electronics associated with the circuits required to separate the left brake actuators from the right brake actuators necessary to achieve anti sway control yet where the circuits shown are provided to operate traditional braking on both the left brakes and right brakes as directed by tow vehicle.

The trailer sway controller ("invention") requires the ability to independently apply power to the trailer left brakes (4) and the trailer right brakes (6) of the towed trailer (9) where the left brakes and right brakes may consist of one or more brake actuators depending upon the brake configuration of the towed trailer and the number of trailer axles on the towed trailer. A "tow vehicle" (1) may be any type of vehicle that utilizes a traditional trailer hitch or fifth wheel to connect the tow vehicle to the towed trailer. A "towed trailer" (9) may be any type of trailer containing one or more axles where at least one trailer axle contains brakes containing any type of brake actuator, where brake actuators include but are not limited to electric brake actuators, hydraulic brake actuators or pneumatic brake actuators. Although this sway controller invention describes the amount of electrical power applied to the brake actuators to vary the braking energy, this invention includes trailer applications where the electrical power is converted to hydraulic power or pneumatic power to create braking energy for different types of brake actuators, versus the common in the art electric brake magnets described within this invention for purposes of clarity. As previously described and shown in FIG. 1 the traditional trailer wiring connects the blue wire (5) braking signal from the tow vehicle (1) brake controller (2) to both the left brakes (4) and right brakes (6) by connecting the brake wires together at one side of axle where existing systems generally running the interconnecting wires between the left brakes (4) and right brakes (6) through or along the axles. As shown in FIG. 2, the sway controller invention (14) connects to the incoming blue wire (5) from the tow vehicle (1) and splits the traditional blue wire into two separate wires, where the sway controller provides two output wires; one wire for the left brakes (10) and a second wire for the right brakes (11). Although various electronic circuits may be used that are obvious to those skilled in the art, as shown in FIG. 2 when the invention (14) is not performing sway control it conditionally activates FET Q1 (12) by pulling the LEFT CONTROL gate signal low and activates FET Q2 (13) by pulling the RIGHT CONTROL gate signal low. Thus when the blue wire (5) from the tow vehicle (1) sends blue wire brake pulses to the towed trailer (9) the blue wire (5) signal is directly connected to the trailer left brakes (4) through Q1 (12) and to the trailer right brakes (6) through Q2 (13) and thus normal trailer braking occurs.

Although numerous fault scenarios may exist in a trailer braking system, one failure mode is where the left brake (4) connecting wires (10) and or right brake (6) connecting wires (11) are directly or indirectly shorted to ground due to a frayed wire, a defective actuator, or various other causes. In some cases, like frayed wire insulation, this short to ground may be intermittent. To detect this type of fault, among others, the invention (14) utilizes a common in the art circuit to "monitor the electrical current flow" through a series resistor R1 (15) using an operational amplifier U1 (16) and connects the output of the operational amplifier U1 to a microprocessor which then determines the amount of current flowing through the blue wire (5) to the brakes, and if the amount of measured current exceeds a short circuit threshold, rather than melt wires, damaging the sway controller (14) or tow vehicle (1) brake controller (2), the sway controller may turn off the left brakes (4) by setting the LEFT CONTROL value high or turn off the right brakes (6) by setting the RIGHT CONTROL value high. The invention shall disable the left brakes (4) and or right brakes (6) for a short period of time, then activate the left brakes and or right brakes again and again to determine if a short circuit continues to exist. After a period of time, where a detected short circuit continues to exist, the invention may turn off either or both of the left brakes (4) by setting LEFT CONTROL high and or the right brakes (6) by setting RIGHT CONTROL high where the lack of blue wire (5) current flow may then be detected by the brake controller (2) within the tow vehicle (1) where the brake controller then indicates "not connected" to the tow vehicle operator. As is common in the art the sway controller device (14) can also independently determine the existence of a short circuit to the left brakes (4) and or right brakes (6) by monitoring the blue wire (5) braking pulse voltage when the left brakes and or right brakes are not activated by the sway controller and comparing the no load voltage to the blue wire braking pulse voltage when the right brakes and or left brakes are activated by the sway controller, where a significant drop in the blue wire braking pulse (5) voltage occurs when the left brakes and or right brakes are connected is then interpreted as an external short circuit condition by the sway controller. As is common in the art the sway controller invention may use various techniques to lengthen the period of time the sway controller attempts to provide blue wire (5) braking power to the brakes, as the sway controller (14) would be of little value if it becomes damaged and thus it shall attempt to protect system integrity whenever possible.

Although the circuits shown in FIG. 2 independently connects the blue wire (5) braking signal to the left brakes (4) and to the right brakes (6) this functionality, by itself, would not provide the capability to reduce trailer sway other than applying trailer brakes when blue wire (4) braking pulses are received from the tow vehicle (1) where the circuit in FIG. 2, or others common in the art, is solely provided to separate the wires normally connected between left brakes (4) and right brakes (6) via common wires and thus enables independent control of the left brakes (4) and right brakes (6).

Figure 5:
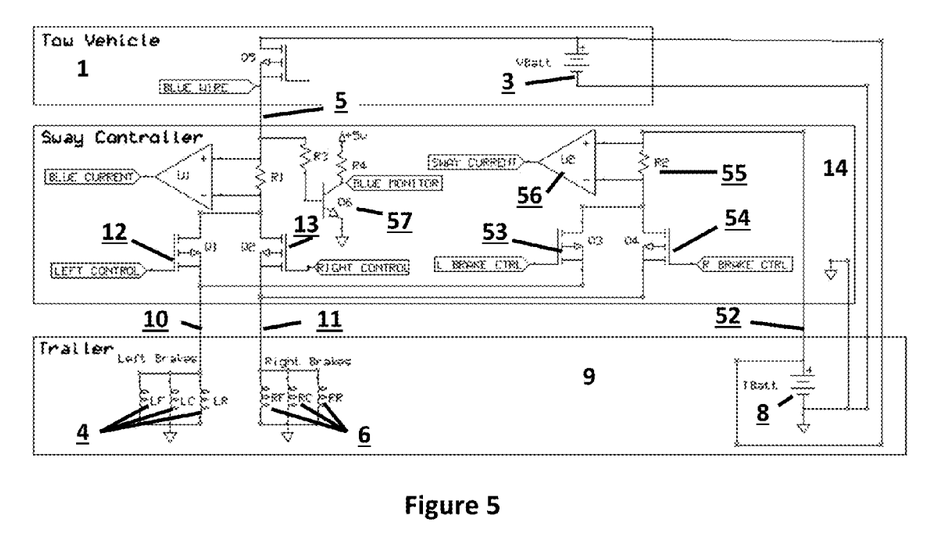
FIG. 5 is an electrical schematic of the electronics contained in FIG. 1 used for normal trailer braking as well as the additional electronics required to provide independent braking of left brakes and right brakes to provide trailer sway control.

Although not shown in a FIG. 2 or FIG. 5 as is common in the art the electronic trailer sway control device (14) contains a microprocessor and memory where the memory contains programs that provide the functionality described within this invention. The electronic trailer sway control device also contains an electronic gyroscope sensor that is connected to the microprocessor and thus provides trailer sway angle information to the programs executing on the microprocessor that the sway angle values are then used to determine the magnitude of electrical power to be applied to the left brakes (4) and or right brakes (6). As is also common in the art the functionality contained within the electronic sway control device described herein could be placed in multiple physical electronic devices interconnected by wires to share information between the multiple physical electronic devices, where the interconnecting wires may optionally be a network through which the multiple electronic devices would share information and thus creates an electronic trailer sway control system. Although for purposes of clarity this invention describes a single electronic sway control device this does not preclude this invention from separating the define functionality between multiple control devices and thus this invention shall be referred to as an electronic trailer sway control system.

Figure 3:
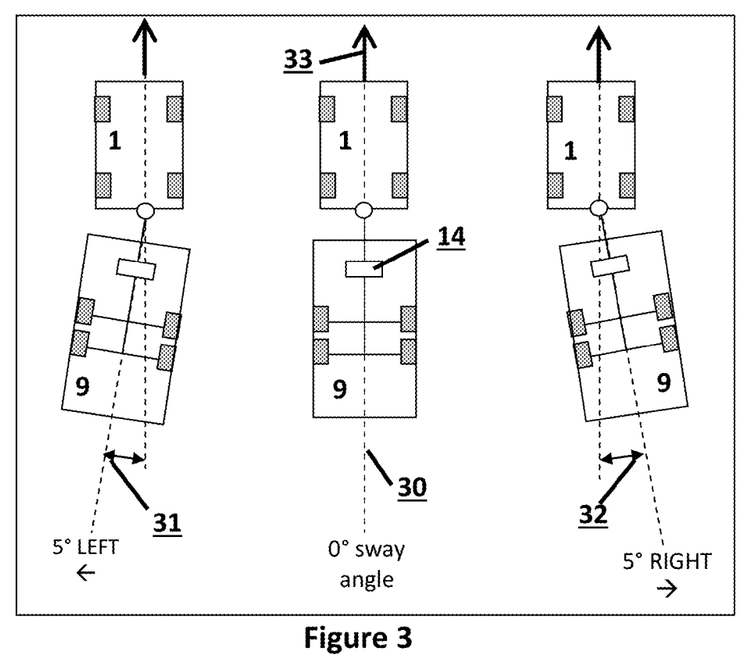
FIG. 3 indicates the orientation of a tow vehicle to the orientation of the towed trailer for the purposes of defining the terms associated with left trailer sway angle and right trailer sway angle.

As shown in FIG. 3 to facilitate reducing the trailer sway angle the microprocessor used in the invention must have knowledge of the relative position of the trailer (9) with respect to the tow vehicle (1) where the change in the trailer (9) position to the left (31) and to the right (32) of the tow vehicle is determined by an electronic sensor, where the output of the electronic sensor enables the inventions microprocessor to determine a change in trailer sway angle relative to the current direction (33) of the tow vehicle (1). The "direction" (33) of the tow vehicle when moving in a forward direction without any existing sway event is defined as being the centerline (30) of the tow vehicle relative to the forward movement (33) of the tow vehicle. Since this invention is for the towed trailer (9) and not the towed vehicle (1) the direction (33) would be more accurately described to be the moving direction of the interconnection point, or trailer hitch point, between the tow vehicle and towed trailer which is the same as the vehicle direction during normal circumstances but where the direction of movement of the trailer interconnection point would be more accurate should the tow vehicle center axis be offset from the direction of travel of the trailer hitch point. The trailer sway controller (14) invention is physically mounted on the trailer (9) where the internal sensor's sway axis is oriented in line with the trailer axle (left to right) where the sensor then provides an indication of the trailer left sway (31) angle and trailer right sway (32) angle of the towed trailer (9) relative to the direction of the tow vehicle (1). When the centerline (30) of the towed trailer (9) is directly in line with the centerline of the tow vehicle (1) the "trailer sway angle" is at zero (0) degrees relative to the direction of the tow vehicle. When the centerline (30) of the trailer (9) is at a 5 degree sway angle relative to the left of the centerline (30) of the tow vehicle (1) the trailer sway angle is considered to be 5 degrees trailer sway angle to the left (31) of the direction of the tow vehicle. When the centerline (30) of the towed trailer (9) is at a 5 degree sway angle to the right of the centerline (30) of the tow vehicle (1) the sway is considered to be 5 degrees right (32). For the purposes of this description, when a vehicle operator is sitting in the driver seat, left sway is when the trailer moves towards the drivers left arm and right sway is when the trailer moves towards the driver's right arm, and this movement is thus relative to the direction (33) of the tow vehicle (1) as shown in FIG. 3.

Figure 4:
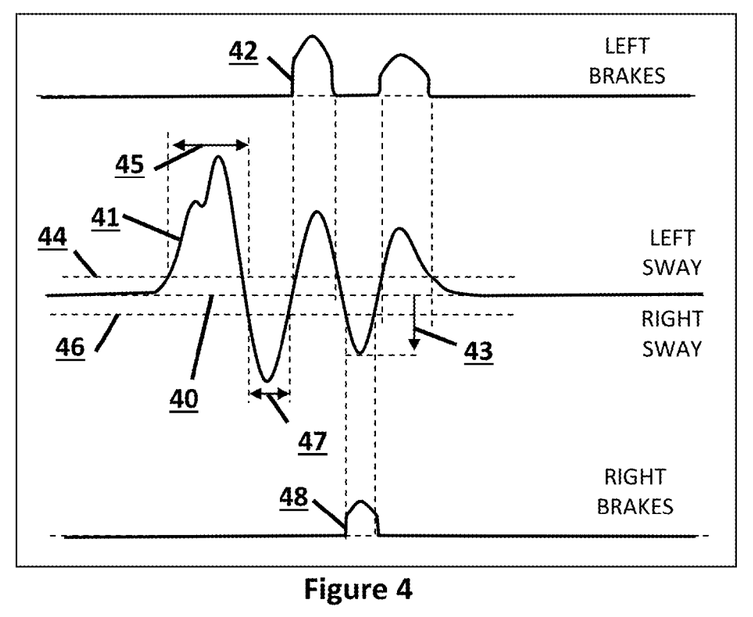
FIG. 4 is an example of a sway sensor output signal used to determine trailer sway angle as well graphical information used to define various terms used in the description of the invention.

Although various sensor technologies may be utilized in this invention to determine trailer sway angle, the output from the electronic gyroscope sensor is shown in FIG. 4. When the trailer (9) sways to the left (31) of the tow vehicle (1) the trailer sway signal (41) rises and when the trailer sways to the right (32) of the tow vehicle the trailer sway signal falls below the zero degrees value (40). A zero degrees trailer sway (30) exists when the tow vehicle (1) and towed trailer (9) are moving in the same zero degrees direction (33) during which the sensor sway signal (41) from the gyroscope sensor shall be constant as indicated prior to the sensor sway signal going above the zero degrees value (40) and following the left and right sway events where the sensor sway signal returns to a straight line. Although the electronic sensor used in this invention utilizes an electronic gyroscope sensor, this invention could also determine trailer sway angle derived from other types of electronic sensors, including but not limited to an electronic accelerometer sensor, a simple electronic potentiometer mechanically moved via mechanical movement between the towed trailer and tow vehicle, a distance measurement sensor monitoring the distance between tow vehicle and towed trailer offset from the center axis of tow vehicle and thus this invention includes other types of electronic sensors that may be monitored by the inventions microprocessor and thus determine trailer sway angle by a different means. As indicated in FIG. 4 during a typical trailer sway and after the sensor sway signal is properly filtered a trailer sway angle signal during a transient sway event is similar in shape to the decreasing sine wave (41). Although the trailer sway angle (41) shown in FIG. 4 indicates a smooth signal trailer sway angle also includes a single dip in the first rising edge of the trailer sway angle, where depending upon the real world events that result in a trailer to sway event, variations in trailer sway angle occur throughout the entire trailer sway event where these variations can be excessive, where solely utilizing the amplitude (43) of the trailer sway angle throughout the entire sway event or merely monitoring the slope of the trailer sway angle with respect to time is insufficient to reliably determine when a sway event occurs. Thus the sway controller invention constantly monitors the amplitude (43) of the sensor sway signal value (41) with respect to the zero trailer sway signal value (40) and the microprocessor then determines if either the left sway time period (45) in the left sway (31) direction or if the right sway time period (47) in the right sway (32) direction is within a range of time durations that indicates if the trailer (9) is either turning a corner or is changing lanes on the highway and thus sway control is not activated or determining if the duration of time exceeding the right sway threshold (44) amplitude and or the duration of time exceeding the left sway threshold (46) amplitude indicates a possible trailer sway event. Thus within this trailer sway controller (14) invention when the left sway duration (45) is greater than a minimum sway activation duration value and is less than a maximum sway activation duration threshold value this indicates a valid sway signal was detected and the trailer may be swaying and is thus referred to as being enabled and or where the right sway duration (47) is greater than a minimum sway activation duration value and is less than a maximum sway activation duration threshold value this indicates a valid sway signal was detected and the trailer may be swaying and is thus referred to as being enabled. In the majority of sway events merely meeting the amplitude and time duration requirements may not be sufficient to determine an actual sway event is occurring. Thus each time the sway activation duration threshold criteria are met, or enabled, in either the left sway direction or right sway direction a sway counter value is incremented, where if the counter value exceeds a sway count threshold value, for example a threshold value of two, and when the sway counter threshold value is achieved in less than a maximum sway watchdog interval of time, like two seconds, trailer sway control actions are thus activated. Thus in this example, when the left sway event meets the left sway timing criteria and when the right sway event meets the right sway timing criteria and where the sway count threshold value of two is met where both sway events occurred in less than the maximum sway watchdog interval of time of two seconds the sway activation of brakes occurs. Whenever the sway activation duration criteria are no longer met, the sway counter is reset to zero. Each time the sway event criteria in either direction occurs the maximum sway watchdog interval timer is reset. Other conditions may also activate the trailer sway control activation, for example when the amplitude of the filtered sensor sway signal exceeds a specific threshold value (44) for a short interval of time that is greater than the minimum sway activation duration value and where the peak amplitude (43) of the sway event detected during the sway interval exceeds a relatively high immediate sway activation threshold value, where this validated trailer sway signal indicates the sway angle is likely due to an external force on the trailer, such as a large gust of wind and thus the trailer sway control actions are activated immediately without regard to the sway counter value. Utilizing common in the art timing and amplitude monitoring techniques the microprocessor in the sway controller invention processes and thus filters the sensor sway signal to determine the sway signal amplitude (43) and duration of the sway signal (45) in either direction and then compares the measured values to the related brake enabling and activation thresholds.

Although the invention has knowledge of the trailer sway angles, and thus the sway amplitude (43) the invention needs the ability to apply the left brakes (4) and or right brakes (6) at varying magnitudes to control the magnitude of braking forces applied to the brakes and thus the trailer tires. Since power is only available from the blue wire (5) when the tow vehicle (1) brake controller (2) is applying brakes, and since sway control functionality must be provided independent of the application of when the brakes are applied within the tow vehicle (1), the invention requires an alternate source of power from which to power the left brakes signal (10) connected to the left brakes (31) and right brakes signal (11) connected to the right brakes (32). This requirement deviates from the existing requirement for trailers containing brakes where the blue wire signal (5) from the tow vehicle (1) activates all the trailer (9) brakes at the same time as described previously and shown in FIG. 1.

As indicated in FIG. 5, due to the existing break away switch requirement a trailer battery (8) resides on the trailer (9) which is either; directly connected to the vehicle battery (3) as shown in FIG. 1, or the vehicle battery is indirectly connected to the trailer battery (8) via a battery charger and or other current limiting charging device (not shown). Although various circuits could be used within the sway controller (14), the invention provides an external connection (52) to an external power source where the external power source is then connected to the left brakes (4) via FET Q3 (53) and connected to the right brakes (6) via FET Q4 (54). As is common in the art the invention also monitors the sway control current flow via series resistor R2 (55) and operational amplifier U2 (56) where the output of the operational amplifier SWAY CURRENT output value is then connected to, and monitored by, the microprocessor where fault detections and fault actions similar to the blue wire (5) short circuit and open circuit faults described previously are performed.

As indicated in FIG. 5, the microprocessor within the invention, as is common in the art, thus has the ability to individually vary power to the left brakes (4) by pulse width modulating the L BRAKE CTRL signal connected to the gate of FET Q3 (53) and individually vary power to the right brakes (6) by pulse width modulating the R BRAKE CTRL signal connected to the gate of FET Q4 (54).

Per prior discussions the invention must be capable of connecting the blue wire (5) braking pulses to the left brakes (4) and right brakes (6) whenever blue wire (5) braking pulses are received and must then be able to independently control the left brakes (4) and the right brakes (6) when a sway event occurs during braking, and thus the invention must monitor the status of the blue wire (5) input signal. Although various circuits that are common in the art may be used, FIG. 5 monitors the blue wire (5) using resistors R3 and R4 and transistor Q6 (57) where the BLUE MONITOR signal is then connected to an interrupt input pin on the microprocessor where the BLUE MONITOR signal goes low when the blue wire (5) goes high and where BLUE MONITOR signal goes high when the blue wire (5) goes low. A "high" blue wire brake pulse is defined to be a blue wire voltage level approaching the tow vehicle (1) battery voltage (3) and a "low" blue wire braking pulse is defined to be a blue wire voltage below the high blue wire voltage by a specific number of volts to ensure the falling edge of the blue wire (5) brake pulse is being detected. Thus the invention has the ability thus to determine when to activate and deactivate the left brake FET Q1 (12) and the right brake FET Q2 (13) and the left brake yaw control FET Q3 (53) and the right brake yaw control FET Q4 (54).

The invention thus has the ability to vary the magnitude of power applied to the left brakes (4) and or right brakes (6) as well as determine at what point in time the varying magnitudes of power are applied to the left brakes (5) and or right brakes (6) where various resulting operation scenarios are described below.

Figure 6:
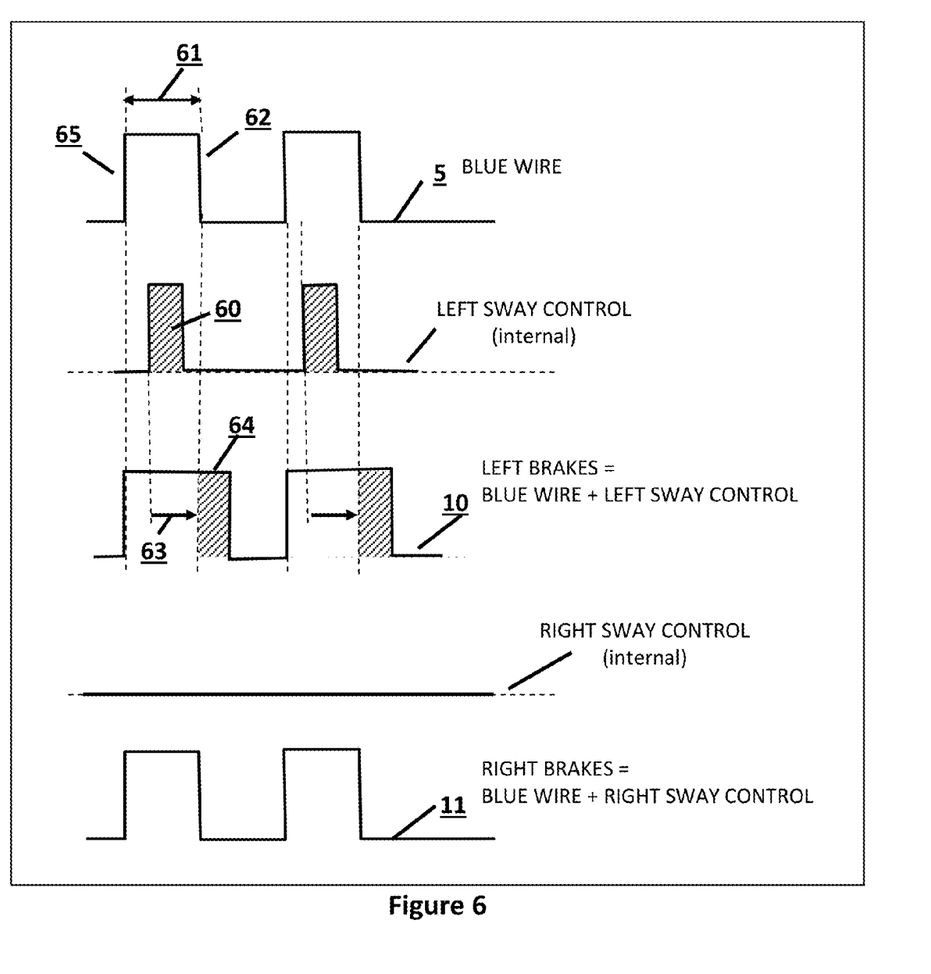
FIG. 6 is an example of the braking signals applied to the left brakes and right brakes due to normal trailer braking as well as additional braking signals added to only the left brakes for purposes of sway control during a left trailer sway event.

SCENARIO 1: When the tow vehicle (1) and trailer (9) are moving down the road in the same direction (33) the output of the sway sensor is constant (40) and the left brakes (4) and right brakes (6) are off. At an intermittent period of time, which is dependent upon the brake controller (2) contained within the tow vehicle (1), as shown in FIG. 6 the brake controller (2) would send a single blue wire (5) braking pulse of a duration (61) too short to activate brakes, where the purpose of a single short blue wire (5) braking pulse is to measure the blue wire (5) current to the trailer brakes and if the measured blue wire current is below a disconnected threshold indicate an open circuit to the tow vehicle (1) operator via a "not connected" indication on the in vehicle brake controller (2) or if the measured blue wire (5) braking pulse current flow is above a disconnected threshold value to indicate "connected" on the in vehicle brake controller. To operate properly with existing brake controllers (2) upon receipt of the blue wire (5) diagnostic pulse the invention detects the rising edge (65) of the blue wire (5) braking pulse via the microprocessor interrupt generated by BLUE MONITOR signal in FIG. 5, where the invention immediately activates both FET Q1 (12) and FET Q2 (13) connecting left brakes (4) and right brakes (6) to the blue wire (5), thus indicating connected on the in tow vehicle (1) brake controller (2). The falling edge (62) of the blue wire (5) braking pulse connected to BLUE MONITOR also generates an interrupt where the invention then immediately deactivates both FET Q1 (12) and FET Q2 (13). If the blue wire (5) signal from the tow vehicle (1) begins to send multiple pulses due to vehicle braking, the prior operation of activating and deactivating both FET Q1 (12) and FET Q2 (13) repeats for every blue wire (5) braking pulse as long as braking is occurring.

SCENARIO 2: When the tow vehicle (1) and the trailer (9) are moving down the road in the same direction (33) and where the trailer (9) then begins to sway to the left (31) and to the right (32). As shown in FIG. 4 when the sway sensor output amplitude (41) exceeds a minimum sway activation threshold value (44) and if the sway duration (45) is less than the maximum sway duration threshold value and then if the sway angle goes in the opposite direction and passes beyond the right sway threshold (46) this behavior is indicative of a sway event where the microprocessor shall apply left brakes (42) during a left sway and apply the right brakes (48) during a right sway angle. When the trailer (9) is swaying left (31) where the left tires are to the left of their normal position relative to the tow vehicle tires and where the right wheels are also to the left of their normal position the invention pulses the left brakes (4) at a high duty cycle of up to 100% duty cycle while the right brakes (6) are turned off or at a very low duty cycle or at a 0% duty cycle. The activation of the left brakes (4) shall result in the pressing of the left brake pads to the left brake drums and the left tire to road friction and thus pulls the trailer (9) back to the right direction where the laws of physics would attempt to track the braking left tires behind to tow vehicle. When the trailer sway angle stops swaying to the left and begins swaying towards to the right where the left brake duty cycle (42) decreases as the trailer (9) returns to centerline (30). This decrease in duty cycle occurs so the trailer does not increase acceleration to the right. Depending upon various application conditions the trailer sway angle approaches zero degrees of sway angle (30) and when crossing from the left sway threshold (44) to the right sway threshold (46) and vice versa an braking overlap may occur where both the left brakes (4) and right brakes (6) are on at a low duty cycle. If the trailer (9) continues to sway to the right exceeding the right sway activation threshold (46) value the right brakes (6) will be activated (48) with increasing duty cycle pulses as the difference between the current sway angle (41) and the zero sway angle (40) until the trailer stops swaying to the right and then begins swaying towards the left, at which time the right brake duty cycle (48) will decrease as the right sway angle decreases. In this scenario the operation continues until the trailer sway angle drops below the left sway activation threshold (44) and the right sway activation threshold (46).

Figure 7:
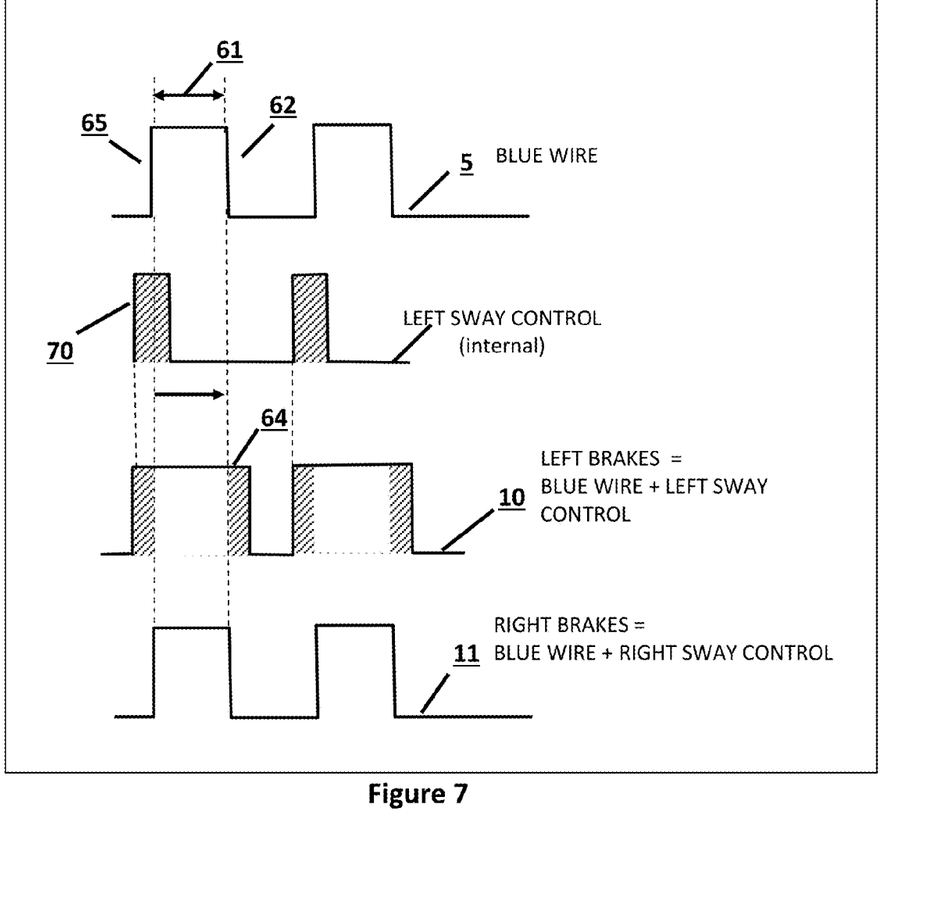
FIG. 7 is an example of the operation of the invention when a left brake sway signal is active when a vehicle brake signal occurs and where the left brake sway signal turns off until the vehicle brake signal turns off and where the left brake sway signal then resumes to add the left brake sway signal to the vehicle brake signal when these brake signals overlap.

SCENARIO 3: Assume the same operation as scenario 2 except assume the vehicle operator applies tow vehicle brakes when the trailer sway event occurs. As previously described in FIG. 2 when the blue wire (5) signal goes high the LEFT CONTROL gate signal to FET Q1 (12) goes low and the RIGHT CONTROL gate signal to FET Q2 (13) also goes low, connecting the blue wire (5) signal to the left brakes (4) and right brakes (6). As previously described in FIG. 5 when the left brakes (4) sway control is required the L BRAKE CTRL gate signal of FET Q3 (53) is goes low to apply power to the left brakes (4) and when right brake (6) sway control is required R BRAKE CTRL gate of FET Q4 (54) goes low applying trailer battery (8) power to the right brakes (6). As shown in FIG. 6 if the blue wire (5) signal is high and if left sway control (60) is requested during a blue wire pulse (5) the left sway control value would apply trailer battery power to the left brakes (4) at the same time as the blue wire (5) is applying the blue wire pulse to the left brakes (4) and thus since power is already applied to brakes from blue wire (5) the sway control power (6) would have no affect on the sway control. As previously described and as indicated in FIG. 5 the invention monitors the blue wire (5) input signal (57) and if the desire to apply the left sway control (60) signal is internally determined by the microprocessor during the blue wire pulse (61) high time, the invention delays the activation of the left sway control pulse (60) until the falling edge (62) of the blue wire pulse (5) is detected and then activates the L BRAKE CNTRL gate signal of FET Q3 (53) where the left brakes signal (10) was first powered from the blue wire (5) through FET Q1 (12) and when Q1 turns off the left brake signal is then powered from the trailer battery (8) when FET Q3 (53) turns on, thus providing one pulse at the left brake wire (10) that is the sum of the blue wire pulse width (61) plus the sway control pulse (6) width. Note the right brakes (6) at the right brake wire (11) only receives power from the blue wire (5) through FET Q2 (13) to the right brakes (6) during a left sway event and thus only blue wire power is applied to the right brakes (6) and thus less power is applied to the right brakes than to the left brakes (4) during the sway control event. A similar operation occurs during a right trailer sway event except where the right brakes (6) would also receive power from the trailer battery (8) than do the left brakes (6). Where in FIG. 6 the sway control pulse occurred during the blue wire pulse other situations exist, as indicated in FIG. 7, where the sway control pulse (70) may be on when the blue wire (5) pulse occurs. When the sway control pulse (70) is on when the rising edge (65) of a blue wire (5) pulse is detected the left sway control FET Q3 (53) shall turn off removing trailer battery (8) power from the left brakes (4) and the blue wire (5) pulse shall immediately be connected to the left brakes by activating FET Q1 (12) and to the right brakes by activating FET Q2 (13). When the falling edge (62) of the blue wire (5) pulse is detected at the BLUE MONITOR (57) signal both FET Q1 (12) and FET Q2 (13) are turned off and the left brake (4) sway control FET Q3 (53) shall turn on and remain on until the remaining left sway pulse duration expires and where FET Q3 (53) is then turned off. Similar operation occurs for the right brakes when a right sway event occurs. The invention shall always connect blue wire (5) pulse to the left brakes (4) and right brakes (6) whenever a blue wire (5) pulse occurs to ensure the in vehicle brake controller (2) indicates connected and where the requested left sway control pulse width and or requested right sway control pulse width shall also be applied to brakes when blue wire (5) pulses occur during a sway event and where a maximum of 100% duty cycle braking shall be applied when the sum of the blue wire (5) pulse width and sway control pulse widths exceed a 100% duty cycle.

The invention, as described thus far, shall reduce trailer sway angle to desired levels when all trailer conditions are perfect and where the trailer brakes are thus applying a consistent amount of brake force when a specified sway controller brake duty cycle is applied to the brake actuators. However various conditions can positively and negatively affect the operation of the trailer brakes where the resulting brake force that occurs when a predefined sway controller duty cycle is applied shall change as the trailer conditions change. For example, a new trailer with new brakes will often be unable to lock up (skid) the tires when the blue wire (5) duty cycle is at 100% since the brake pads are new and have not yet seated with the braking surface. After a few hundred miles and numerous braking events the brake pads wear and seat with the braking surface thus provide their peak braking force versus at a specified blue wire duty cycle, where a 100% duty cycle would now lock up (skid) the tires. As the brake pads wear, and mechanical brake pad adjustment is needed, less braking force shall occur at a specified applied blue wire duty cycle. Numerous other conditions occur that affect the operation of the brakes both positively and negatively, including trailer weight, tire inflation, brake adjustment, battery voltage, quality of wire connections and so forth. On approach would be to maintain sway control capabilities by constantly adjusting brakes, maintaining trailer batteries, tire pressures, constant trailer weights and so forth. However the goal of this invention is to provide the optimal amount of trailer sway reduction possible for a given set of trailer conditions and where achieving reasonable sway control is solely limited by the condition of the existing braking system.

Figure 8:
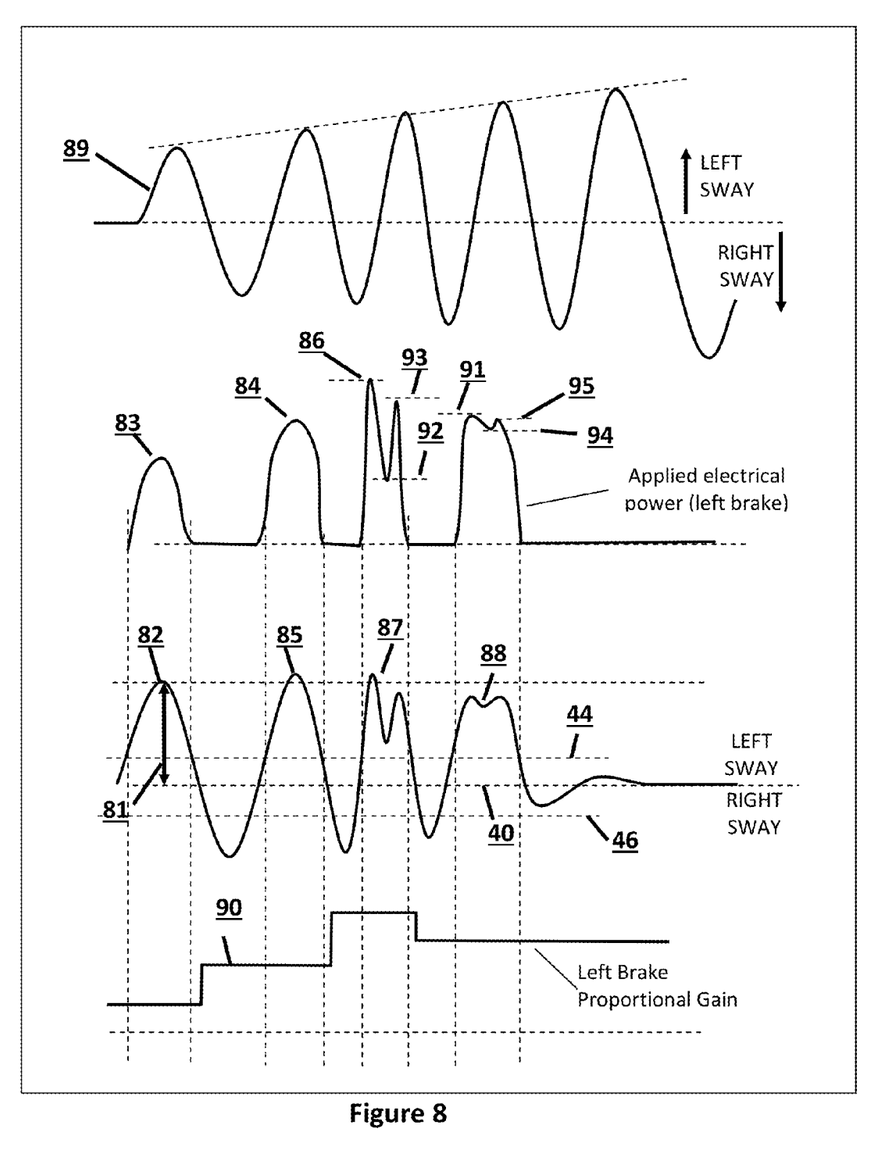
FIG. 8 contains an example of a trailer sway sensor signal where anti sway braking is not performed and contains another sway sensor signal trace that would occur had anti sway braking been applied to the left brake and where the left trailer sway control proportional gain is increased and decreased to provide the desired level of sway angle reduction.

The invention utilizes the monitored trailer sway angle values and other internally generated data to identify when; a) insufficient braking duty cycle is being applied to effectively reduce trailer sway angle, b) excessive braking duty cycle is being applied resulting in an excessive reduction is trailer sway angle, and c) an acceptable reduction in trailer sway angle is being achieved. Although the invention is capable of monitoring the sway angle in an attempt to achieve the listed sway angle correction results, the invention may not always be capable of achieving a desired level of sway angle reduction. For example, independent of the amount of braking duty cycle applied to the brake actuators, very little correction shall occur for a trailer performing braking on ice, hydroplaning tires in a heavy rain, excessively mis-adjusted brake pads, worn out brakes and so forth. The inventions shall attempt to compensate for many changing brake system scenarios in an attempt to provide the optimal reduction in sway angle. Prior to describing the automatic adjustment of the sway controller's operation various terms must be defined. As shown in the top trace in FIG. 8 a undesired trailer sway signal (89) is where the trailer sway reaches a peak sway amplitude first in one direction, in this example first in the left sway direction, then the amplitude of the trailer sway signal drops in the right direction, then rises to an to even higher peak amplitude in the left direction where the trailer sway signal continues to increase until the vehicle operator will likely lose control of the towed trailer and or tow vehicle. The ability to reduce trailer sway is thus defined as the ability of the sway controller invention to decrease the amplitude of each trailer sway signal (89) relative to what the amplitude would have been if a corrective action, such as where applying trailer brakes, did not occur. This sway controller invention varies the magnitude of electrical power applied to brake actuators as a means of increasing the braking pressure created by the brake actuators where the magnitude of electrical power is considered to be insufficient to reduce trailer sway when the desired reduction in the trailer sway signal is not being achieved at the magnitude of electrical power currently being applied, where the worst case scenarios is where the maximum electrical power is applied and where there is no affect on the trailer sway angle, indicating reduction in the trailer sway angle is beyond the capabilities of the sway controller invention. Conditions beyond the sway reduction capabilities of the sway controller include such sway events as while driving on an ice covered road or where the brake actuators have been disconnected from the sway controller or where the brake actuators are misadjusted so badly that full power to the brakes provides little or no braking force on the trailer tires. One example of where the magnitude of electrical power being applied to the brake actuators being insufficient to reduce trailer sway would be where the first rising trailer sway signal (89) in the upper trace of FIG. 8 is the same amplitude (81) of the trailer sway signal (82) for the exact same sway event where the amplitude of the electrical power applied to the left brakes (83) during the first sway event did not reduce the trailer sway amplitude relative to the reduction that would occur had no braking signal been applied. The other extreme of reducing trailer sway is where the magnitude of the electrical power being applied exceeds the desired reduction in trailer sway where upon application of the present magnitude of electrical power the trailer immediately and rapidly changes sway direction where this rapid change in trailer sway direction could worst case result in excessive trailer sway in the alternate sway direction and or where the trailer tires lock up thus skidding the tires where the applied magnitude of electrical power of a lower magnitude would otherwise have more slowly reduced the magnitude of trailer sway signal. An example of where the electrical power being applied exceeds the desired reduction in trailer sway is where a very rapid change in direction of the trailer sway angle (87) occurs when the electrical power (86) is applied. The desired reduction in trailer sway signal is shown where upon exceeding the left sway activation threshold (44) that the applied electrical power (91) almost immediately stops an increase in the left sway signal (88) and where the trailer sway signal following the application of braking power does not exceed the brake activation threshold in the opposite sway direction, or in the example the next right sway angle does not exceed the right sway threshold value (46), thus indicating the successful stopping of the trailer sway. During the life of the electronic sway controller (14) system within a towed trailer (9) all of the conditions described thus far may exist where the magnitude of the electrical power applied to the brake actuators shall be insufficient, where the power shall be excessive or where the power shall be at the desired magnitude of electrical power relative to achieving the desired reduction in trailer sway signal, where the sway controller invention shall constantly increase, decrease or not change the proportional gain value in an attempt to achieve the desired reduction in trailer sway.

Although not discussed thus far, but as is common in the art, the invention utilizes standard control theory techniques to determine the magnitude of left brake (4) signal (10) and right brake (6) signal (11) to be applied to the brake actuators. For example the invention utilizes common in the art proportional control and could incorporate common in the art Proportional Integral Derivative (PID) control theory. The proportional contribution applied to the left brakes (4) and or right brakes (6) is calculated using the difference (81) between the current sway sensor signal value (82) and the zero sway value (40), commonly called error, where the error is then multiplied times a proportional gain (90) value and the result of this calculation is then used to determine the controlled output value, where the controlled output value in this application determines the percent duty cycle (83) value applied to the left brake FET Q3 (53) during a left sway event and or right brake FET Q4 (54) during a right sway event. Although as is common in the art PID control algorithms may also contain integral and derivative contributions to the controlled output values, but for purposes of clarity this description shall only describe the simplest proportional control contribution.

As shown in FIG. 8, the sway in the left direction shall be described, where upon the first application of electrical power to the left brakes (83) where the amplitude and shape of the sway sensors signal value during the first activated left sway event (82) is as shown and where a similar operation, not shown, then occurs for the right brakes during a right sway angle event. Since the microprocessor does not observe a rapid decrease in the left sway signal (82) when the brakes are first applied (83) the microprocessor shall increase the proportional gain (90) used to calculate the left brake duty cycle, where during the second left sway event (85) the magnitude of the left brake duty cycle has increased (84) for the same amount of error during the first sway event (82) and thus more brake pressure is applied. However note the amplitude and shape of the second sway signal (85) changed little from the prior sway signal value (82). Since the amplitude of trailer left sway value was not reduced during the first trailer sway, and for an increased magnitude of left brake duty cycle (84) during the second trailer sway the sway signal value (85) was not affected, the invention again increases the amount of proportional gain (90) following the second left sway (85). During the third left sway event the peak amplitude of the left brake duty cycle (86) was thus greater for the same amount of error due to the prior increase in the proportional gain (90) but where the resulting sway signal value (87) now takes a rapid dip towards the zero sway value (40), where the resulting reduction in the error thus resulted in a similar reduction in the left brake duty cycle thus releasing brake pad pressure on the left brakes, thus resulting in a rise in the left sway direction as indicated by the second peak during the third sway event (87).

The presence of an oscillation in the brake duty cycle values is detected within the invention by capturing the maximum amplitude of the first detected peak (86) value called first peak value determining the minimum amplitude of the following valley value (92) called valley bottom value and determining the amplitude of the second peak (93) called second peak value during each sway event. The microprocessor then subtracts the valley bottom value (92) from the first peak value (86) to determine the valley drop value and also subtracts the valley bottom value (92) from the second peak value (93) to determine the valley rise value. The microprocessor then compares the valley drop value and valley rise value to an increase power threshold value and a decrease power threshold value where a very small or nonexistent valley rise value indicates no valley was detected, as in shown in the first sway event (82) and the second sway event (85) signal values and in the first applied electrical power values (83) and second applied electrical power values (84). When the valley rise value exceeds a minimum valley detection threshold value the microprocessor determines a valley event does exist as indicated in third sway event (87) and in the forth sway event (88) as well as the third applied electrical power values (86) and the forth applied electrical power values (91). A valley is determined to exist from small rises in sway angle values (88) and small rises in applied electrical power values where the bottom valley value (94) is subtracted from the second peak value (95) to determine the valley rise value for the sway event and where the bottom valley value (94) is subtracted from the first peak value (91) to determine the valley drop value for the sway event where the resulting differences exceed minimum valley detection threshold value. When the calculated valley rise value is less than the minimum valley detection threshold value the sway event is assumed to be similar to the first sway event (82) and the second sway event (85).

By comparing the valley drop value and the valley rise value to an increase power threshold value and a decrease power threshold value where the magnitude of the increase power threshold value and decrease power threshold value is determined by the first peak value the microprocessor then determines when excessive power, insufficient power, or desired power application behaviors are achieved. In the example, the desired value for the proportional gain (90) is thus determined to be a desired value greater than the proportional gain value applied during the second sway event (85) and less than the proportional gain value applied during the third sway event (87), where the proportional gain value is then decreased prior to the fourth sway event. During the fourth sway event the sway signal value (88) and the related brake duty cycle value (91) achieves the preferred plateau for both signals where the magnitude of the valley drop bottom value (94) and the associated rise to the second peak value (95) where the valley drop value and valley rise value do not exceed the decrease power threshold value and since the valley drop value and valley rise value are greater than the increase power threshold value thus the left brake proportional gain (90) value shall remain at its present value during braking event four (88) and shall remain at its present value until the next trailer sway event, which may or may not increase or decrease the proportional gain value based upon the behavior observed when the brake duty cycle signals are applied. Since the left brakes (4) may require different magnitudes of electrical power to achieve the desired sway signal shape versus the proportional gain value required to reach the desired right brake signal shape the left brakes proportional gain value (90) may be set to a different value than the right brakes proportional value. This invention thus monitors the sway signal and the associated brake duty cycle values to determine when the application of the respective magnitude of the brake duty cycle does not result in a desired drop in the trailer sway angles when a specific magnitude of the duty cycle is applied and thus the brake duty cycle is thus increased or decreased until the desired sway signal and the associated brake output wave shape is captured by the sway controller for both the left trailer brakes and right trailer brakes within this inventions microprocessor.

What is claimed:

1. A method for detecting a sway event in a trailer, comprising the steps of:
   receiving a signal corresponding to a sway angle;
   comparing the signal to an activation threshold;
   measuring a duration for which the signal exceeds the activation threshold;
   detecting the sway event when the duration exceeds the activation threshold for a predetermined time;
   incrementing a sway counter upon detection of the sway event; and
   generating a brake control signal after the sway counter has been incremented at least twice.

2. The method of claim 1 wherein the signal corresponding to the sway angle is generated by a gyroscope.

3. The method of claim 1 further comprising the step of determining a direction of sway as a function of the signal, wherein the brake control signal is selectively applied to one of a left brake and a right brake as a function of the direction of sway.

4. A method for detecting a sway event in a trailer, comprising the steps of:
   receiving a signal corresponding to a sway angle, wherein the sway angle defines a deviation by the trailer from an aligned position behind a tow vehicle and wherein the signal corresponding to the sway angle has a variable amplitude corresponding to the sway angle;
   comparing the signal to an activation threshold;
   measuring a duration for which the signal exceeds the activation threshold;
   detecting the sway event when the duration exceeds the activation threshold for a predetermined time;
   generating a brake control signal responsive to detecting the sway event; and
   determining a variable amplitude of the brake control signal as a function of the variable amplitude of the signal corresponding to the sway angle.

5. The method according to claim 4 wherein the steps are repeated at a periodic interval to determine the variable amplitude of the brake control signal required to reduce the variable amplitude of the signal corresponding to the sway angle.

6. The method according to claim 5 wherein a control routine determines the variable, amplitude of the brake control signal, the method further comprising the step of tuning the control routine as a function of a difference in the amplitude of the brake control signal determined during a first periodic interval and the amplitude of the brake control signal determined during a second periodic interval.

7. The method of claim 4 wherein the signal corresponding to the sway angle is generated by a gyroscope.

8. The method of claim 4 further comprising the step of determining a direction of sway as a function of the signal, wherein the brake control signal is selectively applied to one of a left brake and a right brake as a function of the direction of sway.

9. A system for detecting a sway event in a trailer, comprising:

a sensor configured to generate a signal corresponding to a sway angle;
a memory configured to store a plurality of instructions;
a processor configured to receive the signal and to execute the plurality of instructions to:
compare the signal to an activation threshold,
measure a duration for which the signal exceeds the activation threshold,
detect the sway event when the duration exceeds the activation threshold for a predetermined time,
increment a sway counter upon detection of the sway event, and
generate a brake control signal after the sway counter has been incremented at least twice.

10. The system of claim 9 wherein the sensor is a gyroscope.

11. The system of claim 9 wherein the processor is further configured to execute the plurality of instructions to:
determine a direction of sway as a function of the signal corresponding to the sway angle;
generate a first brake control signal responsive to the direction of sway being in a first direction; and
generate a second brake control signal responsive to the direction of sway being in a second direction.

12. A system for detecting a sway event in a trailer, comprising:
a sensor configured to generate a signal corresponding to a sway angle, wherein the sway angle defines a deviation by the trailer from an aligned position behind a tow vehicle and wherein the signal corresponding to the sway angle has a variable amplitude corresponding to the sway angle;
a memory configured to store a plurality of instructions;
processor configured to receive the signal and to execute the plurality of instructions to:
compare the signal to an activation threshold,
measure a duration for which the signal exceeds the activation threshold,
detect the sway event when the duration exceeds the activation threshold for a predetermined time,
generate a brake control signal responsive to detecting the sway event, and
determine a variable amplitude of the brake control signal as a function of the variable amplitude of the signal corresponding to the sway angle.

13. The system of claim 12 wherein the processor executes at a periodic interval to determine the variable amplitude of the brake control signal required to reduce the variable amplitude of the signal corresponding to the sway angle.

14. The system of claim 13 wherein the processor is further configured to:
execute a control routine to determine the variable amplitude of the brake control signal, and
tune the control routine as a function of a difference in the amplitude of the brake control signal determined during a first periodic interval and the amplitude of the brake control signal determined during a second periodic interval.

15. The system of claim 12 wherein the sensor is a gyroscope.

16. The system of claim 12 wherein the processor is further configured to execute the plurality of instructions to:
determine a direction of sway as a function of the signal corresponding to the sway angle;
generate a first brake control signal responsive to the direction of sway being in a first direction; and
generate a second brake control signal responsive to the direction of sway being in a second direction.

* * * * *